Patented Dec. 1, 1925.

1,563,604

UNITED STATES PATENT OFFICE.

LAWRENCE E. WHITLOCK, OF LE ROY, NEW YORK.

CLEANING POWDER AND DISINFECTANT.

No Drawing. Application filed September 27, 1924. Serial No. 740,239.

*To all whom it may concern:*

Be it known that I, LAWRENCE E. WHITLOCK, a citizen of the United States, residing at Le Roy, in the county of Genesee and State of New York, have invented certain new and useful Improvements in Cleaning Powders and Disinfectants, of which the following is a specification.

I have invented a composition of matter to be used for the purpose of disinfecting and cleaning toilets and other similar purposes of which the following is a specification.

First, I take an organic substance such as vegetable ivory and reduce it to a powder of about the fineness of ordinary cornmeal. It will be understood that vegetable ivory is found in a nut which grows in Brazil and is used largely for making buttons. The waste material that is made in the manufacture of buttons is very suitable for my purpose in the making of this composition of matter and for this purpose I grind up the waste material to the fineness indicated above, namely, the fineness of ordinary cornmeal.

I also use the so-called nitre-cake which is a by product in the manufacture of nitric acid when nitric acid is made from nitrate of soda or Chile salt peter and sulphuric acid. The reaction in the manufacture of nitric acid is as follows: $NaNO_3$ plus $H_2SO_4$ equals $NaHSO_4$ (nitre cake) plus $HNO_3$ (nitric acid). This reaction takes place below 200° centigrade. (See Dispensatory of the U. S. of America 20th edition by Remington & Wood, J. B. Lippincott, Philadelphia, publisher, page 45.) This nitre-cake comes from the retort hot and dry and is ground up to a consistency or fineness of ordinary cornmeal.

To make the composition of matter I take from 2% to 10% of the ground vegetable ivory and add thereto from 98% to 90% of the ground nitre-cake dry. That is to say, if I want the composition relatively low in the vegetable ivory I take two parts of vegetable ivory by weight and 98 parts of the ground nitre-cake by weight and mix them together, and if I wish the composition relatively high in vegetable ivory or other organic matter I take as much as ten parts of vegetable ivory and 90 parts of the ground dry nitre-cake.

If the organic matter is increased above 2% the nitre-cake is diminished to correspond in making up the 100 parts as above indicated for any mixtures of intermediate strength. There elements are mixed or mechanically stirred together dry and at any stage of the process of preparing or mixing the parts or after the parts have been mixed I add a trace of a powdered blue dye or color, one that is soluble in water and preferably organic. It will also be understood that the blue color can be added to either of the ingredients or to the mixture in either dry or liquid form. The quantity of the blue that will be used is merely a small fraction of 1% of the total mass and will be sufficient to whiten the surfaces with which the disinfecting material comes into contact and is used only for that purpose, and as an excessive amount of it would tint or color the surface, the amount used must be kept small enough to avoid such a result.

It will be understood that nitre-cake is very hygroscopic or delequescent, that is, it absorbs moisture freely from the atmosphere, and the moisture so absorbed causes it to crystallize or set which is objectionable. The vegetable ivory dust delays or retards or interferes with the absorption of moisture and prevents the crystallization or setting of the nitre-cake and the more vegetable ivory dust that is used in the composition, the more the absorption of water is interfered with and the more the crystallization is retarded and the better the nitre-cake is kept in its powdered condition. It will also be understood that the nitre-cake is the disinfectant and that the vegetable ivory dust is inert and the percentage of each that will be used will vary according to the conditions under which the composition is to be made or used. It will also be understood that nitre-cake ordinarily contains some sulphuric acid and I have discovered that the vegetable ivory is an organic compound that is not affected at all by the sulphuric acid of the nitre-cake or is not materially affected thereby when used in this composition.

I claim:

1. A disinfecting compound, composed of nitre-cake and vegetable ivory, ground and mixed in suitable proportions to prevent setting of the nitre-cake and leave it free to dissolve for disinfecting purposes.

2. A disinfecting compound, composed of nitre-cake and vegetable ivory, ground and mixed in the proportion of from two to ten parts of vegetable ivory and the remainder of one hundred parts of nitre-cake.

3. A disinfecting compound, composed of nitre-cake and vegetable ivory, ground and mixed in the proportion of from two to ten parts of vegetable ivory and the remainder of one hundred parts of nitre-cake, a fraction of one per cent of blue color being added thereto.

4. A disinfecting compound composed of a large percentage of nitre cake and a small percentage of vegetable ivory ground and mixed in suitable proportions to prevent setting of the nitre cake and leave it free to dissolve for disinfecting purposes.

In testimony whereof I affix my signature.

LAWRENCE E. WHITLOCK.